Feb. 25, 1969    N. J. RYSKAMP    3,429,392
AUTOMATIC BRAKE ARRANGEMENT FOR SHORT TURN RADIUS STEERING
Filed June 5, 1967

Inventor
Neil J. Ryskamp
By Charles L. Schwab
Attorney

United States Patent Office 3,429,392
Patented Feb. 25, 1969

3,429,392
AUTOMATIC BRAKE ARRANGEMENT FOR
SHORT TURN RADIUS STEERING
Neil J. Ryskamp, Markham, Ill., assignor to Allis Chalmers Manufacturing Company, Milwaukee, Wis.
Filed June 5, 1967, Ser. No. 643,640
U.S. Cl. 180—6.3         7 Claims
Int. Cl. B62d 15/00

ABSTRACT OF THE DISCLOSURE

Herein illustrated and described is an automatic braking arrangement to assist in short turn radius steering of a vehicle. When the steerable wheels of the vehicle are steered to make a minimum radius turn, the brake on the nonsteered wheel on the inside of the turn is automatically applied. The automatic braking system operates as an integral part of the regular braking system without interference with the conventional braking of the vehicle.

---

This invention relates to automatic braking of the nonsteered wheel on the inside of the turn to assist in short turn radius steering of a vehicle.

In a vehicle such as a lift truck, efficient use of space requires that the vehicle be capable of turning in the shortest possible radius. Theoretical turn radius of any vehicle is a function of such physical dimensions as length, width, wheelbase, overhangs, etc., and the degree to which the steer wheels can be turned. As the angle of the steer wheels relative to drive wheels increases, so does the side thrust on the steer wheels. Actual turning radius under power will exceed theoretical radius due to creep and scuffing of tires. The braking arrangement of the present invention is designed to produce a turning moment at the differential type drive axle, cooperative with the angle of the steer wheels to achieve theoretical radius at maximum angle of steer. This I accomplish by braking the inside drive wheel so that the motive force is provided by the outside drive wheel which produces a turning moment in the direction to which the steer wheels are oriented.

Action of my automatic braking arrangement is automatic and an integral part of the regular brake circuit. There is no interference between operation of the turn assist braking mechanism and the service brakes. They operate separately in a proper manner and when operated simultaneously, the stronger force application takes precedence. The automatic braking is effected only in the last few degrees of turn, at which time a minimum turn radius is being steered by the operator.

It is an object of this invention to provide an improved minimum turn radius steering arrangement, in which the appropriate nonsteered wheel is automatically braked, which is low in cost, reliable in operation and requires a minimum amount of maintenance.

It is a further object of this invention to provide an automatic braking device for the nonsteered wheel nearest the center of the turn circle which is integrated with the regular vehicle braking system and is operated in response to short turn steering.

It is a further object of this invention to provide automatic braking mechanism for the nonsteered wheels of a vehicle as hereinbefore outlined which is disposed in the service braking system between the brake pedal and wheel cylinders and which provides automatic makeup of brake fluid in case of leakage or brake shoe wear.

These and other objects and advantages of this invention will be apparent to those familiar with the art when the following description is read in conjunction with the drawings in which.

Description

Figure 1:
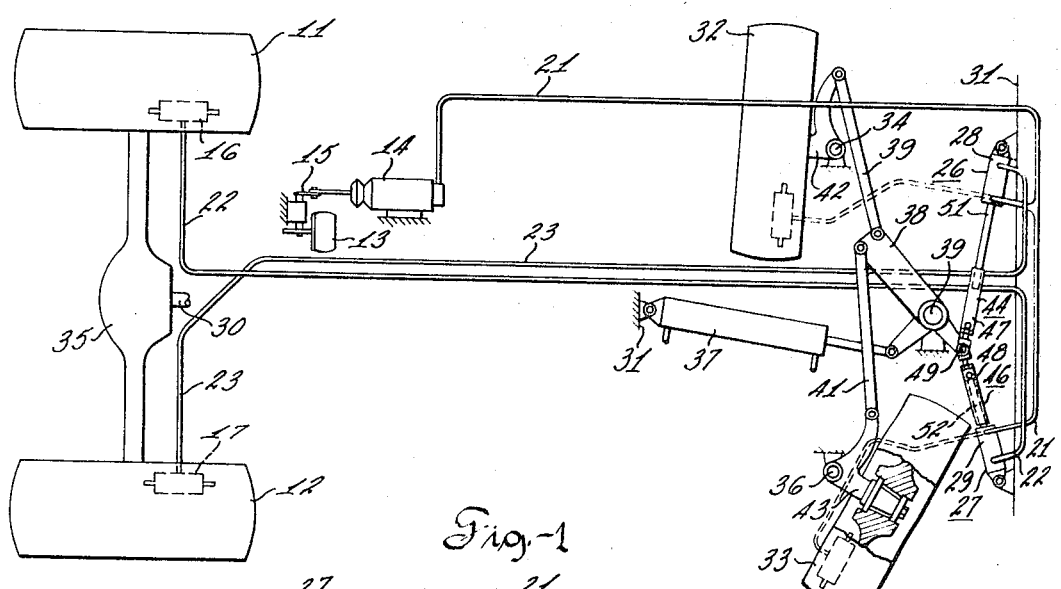
FIG. 1 is a schematic illustration of a vehicle braking system incorporating my invention.

My invention is shown in the systematic illustration of FIG. 1 wherein the braking system for a pair of vehicle drive wheels 11, 12 includes a manually controlled fluid pressure delivery means including a brake pedal 13 and a master cylinder 14 interconnected by suitable linkage 15. The master cylinder 14 supplies pressure fluid to wheel cylinders 16, 17 of the brakes for drive wheels 11, 12 through a main brake line or conduit 21 and branch lines or conduits 22, 23. Intermediate the point at which the main brake conduit 21 divides into conduits 22, 23 and the wheel brakes, fluid passes through short turn brake actuators 26, 27, the cylinder structures 28, 29 of which are pivotally connected to the vehicle frame 31. The actuators 26, 27, which are identical in construction, have lost motion means interposed between their piston structures and the steering apparatus so that the service brake on the drive wheel on the inside of the turn is not braked until the steered wheels are turned to almost the maximum extent. The drive wheels are connected in driven relation to drive shaft 30 through a differential 35.

As illustrated, the wheels 32, 33 are steered about their kingpin axes 34, 36 by a steering apparatus including a double acting hydraulic ram 37 connected to a steering wheel operated valve, not shown. The ram 37 has one end connected to the vehicle frame 31 and the other end connected to a steering quadrant 38 pivotally mounted on the vehicle frame 31 by a pin 39. In addition to the ram 37 and steering quadrant 38, the steering apparatus includes tie rods 39, 41 interconnecting the steering quadrant 38 and steering arms on the wheel axles 42, 43. The lost motion means between the automatic brake actuators 26, 27 and the steering quadrant 38 take the form of two part piston rods 44, 46, the outer sleeve parts 47, 48 of which are pivotally connected to an arm of the quadrant 38 on a common axis 49. The outer sleeve parts 47, 48 of the piston rods 44, 46 have a telescoping lost motion fit with inner cylindrical parts 51, 52.

Figure 2:
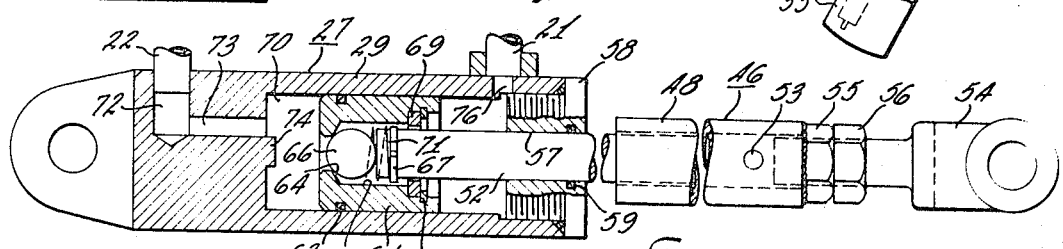
FIG. 2 is a section view of one of the pair of automatic braking actuators of my invention.
Figure 3:
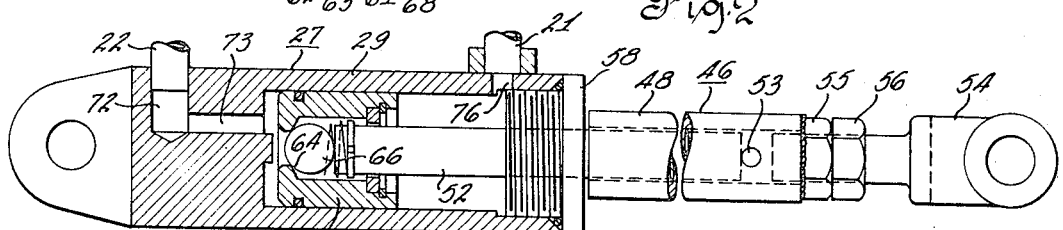
FIG. 3 shows the braking actuator in a brake applying position.
Figure 4:
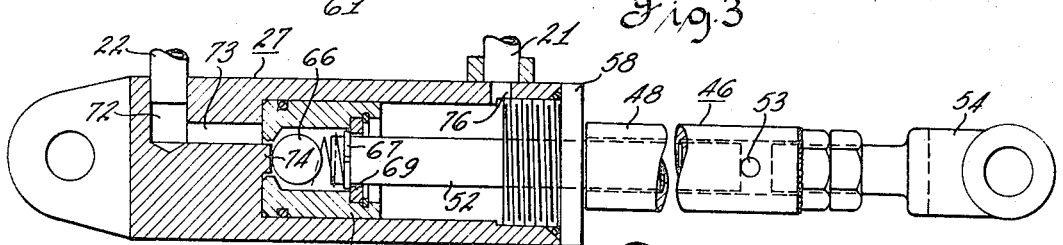
FIG. 4 shows the brake fluid makeup position of the braking actuator.

In FIGS. 2, 3 and 4, I illustrate automatic brake actuator 27 in detail and it should be understood that actuator 26 is of the same construction. The sleeve part 48 of two part rod 46 includes a stop pin 53 which serves as an abutment for inner part 52, as shown in FIGS. 3 and 4, to limit contraction of the rod 46. The sleeve part 48 includes a yoke 54 threaded into a nut 55 welded to the sleeve portion and a lock nut 56. The inner part 52 of rod 46 extends through a bore 57 in threaded cap 58 of cylinder 29 and is sealed relative thereto by an O-ring 59. The telescoping parts 47, 51 and 48, 52 effect lost motion thrust transmitting connections between the actuators 26, 27 and the steering apparatus.

A piston 61 is slidably fitted within cylinder structure 29 and is sealed for reciprocating motion by O-ring 62. Piston 61 is provided with a passage 63 therethrough presenting a seat 64 for a check valve in the form of a ball 66. A spring 71 between the ball 66 and rod part 52 biases check ball 66 toward its seat 64. Rod part 52 is assembled to piston 61 by means of a snap ring 67 and a spacer ring 69 retained by snap ring 68 so as to permit relative axial movement between piston 61 and rod part 52. Spacer ring 69 is loosely fitted to rod part 52 to permit passage of fluid therebetween. The assembly of the piston 61 and rod 46 may be referred to as a piston structure.

The cylinder structure 29 and piston 61 define a pressure chamber 70 in fluid communication with the wheel brake cylinder 16 via conduit 22 and drilled passages 72, 73. A cylindrical projection 74 forms an abutment for moving the ball 66 off its seat 64 when the piston 61 moves under fluid pressure to near the inward limit of its travel in cylinder structure 29 and in such condition makeup fluid is permitted to pass from one side of the piston 61 to the other to compensate for leakage or wear in the brake linings on brake shoes 77, 78.

Figure 5:
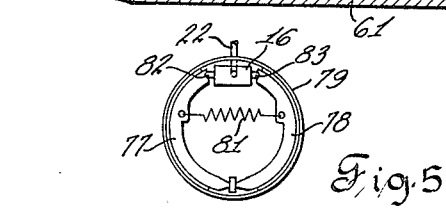
FIG. 5 shows the wheel brake employed in the vehicle braking system illustrated in FIG. 1.

As shown in FIG. 5, the hydraulically operated brake for nonsteered wheel 11 includes a brake drum 79, shoes 77, 78 interconnected by a return spring 81, and wheel brake cylinder 16 having pistons 82, 83 engaging shoes 77, 78. It should be understood that a similar hydraulically operated brake is provided for nonsteered wheel 12.

*Operation*

In normal vehicle braking, when operator depresses brake pedal 13, the master cylinder 14 is activated to deliver fluid into line 21. This fluid is conveyed into port 76 of actuator 27 and the corresponding port of actuator 26 causing the pistons of the actuators to move inwardly toward the closed ends of the cylinder structures 28, 29. Fluid ahead of the pistons is displaced through lines 22, 23 to wheel cylinders 16, 17 which are thereby extended causing the brake shoes to contact drums in wheels 11, 12. Release of brake pedal 13 permits wheel cylinders 16, 17 to be retracted by the shoe retraction springs. As shown in FIG. 5, the shoes 77, 78 are moved away from the brake drum 79 by return spring 81 thereby retracting the pistons 82, 83 into cylinder 16. Fluid displaced from the wheel cylinder 16 moves the piston 61 of actuator 27 back to the original position as shown in FIG. 2. Rod part 52 is free to follow the piston 61 in this movement by sliding outwardly into sleeve part 48. If the fluid requirements at the wheel cylinder 16 is increased because of leakage or brake lining wear that is not compensated for by adjustment, the piston 61 will travel a greater distance until ball 66 is unseated by projection or abutment 74 permitting makeup fluid to be transferred from the rod side of piston 61 to pressure chamber 70, thereby increasing the volume of fluid on the brake side of piston 61. Thus, an automatic hydraulic brake adjuster is incorporated into each actuator 26, 27.

With the steering apparatus in a centered position for straight line driving, the rod parts 51, 52 will be a predetermined distance from the abutment pins near the yoke end of sleeves 47, 48. When the steerable wheels 32, 33 are moved for a turn, as illustrated in FIG. 1, rod part 51 withdraws from sleeve part 47 while the rod part 52 retracts into sleeve part 48 until the abutment pin 53 is contacted. At this point, the inside steerable wheel 32 is at an angle of 65° to 70°. Further increase of the turning angle results in the rod part 52 contacting ball 66 and moving ball and piston 61, as shown in FIG. 3, toward passage 73 in the closed end of the cylinder structure 29. Fluid is displaced via line 22 into wheel cylinder 16. Initially, this displacement results in taking up of clearances, espectially between brake lining on shoes 77, 78 and drum 79. When the maximum turn angle of approximately 90° of the inside wheel 32 is reached, brake contact is at required pressure to hold the inside drive wheel 11. Actual pressure build-up to achieve braking takes place in the final 3° to 6° of turn.

Adjustment to necessary pressure to achieve automatic braking is easily made by the adjustable yoke portion 54. During this cycle, the opposite actuator 26 is extending by withdrawing rod part 51 outwardly in sleeve part 47. When the steered wheels 32, 33 are moved back toward a centered position, wheel cylinder 16 is retracted by its brake return spring and displaced fluid moves the piston 61 of actuator 27 back to original position as shown in FIG. 2.

As shown in FIG. 3, the actuator 27 is in its shortest retracted condition and the steerable wheels 32, 33 are at the extreme turn position in one direction as illustrated in FIG. 1. The actuator piston 61 has displaced fluid through line 22 to apply the brake on inside drive wheel 11 at, for example, 500 p.s.i. Rod part 52 is under compression and there is no fluid pressure on the rod side of piston 61. Fluid has been drawn from the master cylinder 14 through port 76 by movement of piston 61. In actuator 26, there is no pressure on either side of piston. Assuming now that operator depresses brake pedal 13, the master cylinder 14 is activated to displace fluid in line 21. Pressure below 500 p.s.i. will move the piston in actuator 26 to apply the brake on the outside drive wheel 12. When fluid pressure from the master cylinder reaches 500 p.s.i., both brakes will be equalized and additional pressure will be applied to both wheels equally.

As pressure on brake pedal is reduced, pressure in both brakes is uniformly reduced to 500 p.s.i. Further reduction results in load transfer back to rod part 52 in actuator 27 holding the brake on inside wheel at the initial pressure of 500 p.s.i. while brake on outside drive wheel 12 may be completely released. If the steer wheels 32, 33 are turned during a period of foot brake application, the new position of rod part 52 will determine whether or not any pressure is retained in inside brake when the foot brake is released.

In another situation, the service brakes may be applied before the steerable wheels are turned sufficiently to bring the automatic braking mechanism into operation. Assume the foot brakes are applied to 200 p.s.i. to reduce the speed of the vehicle. If the steer wheels 32, 33 are now turned to a maximum turn angle, one actuator will be contracted causing its piston to move toward the closed end of its piston structure. Pressure will be increased on inside drive wheel brake to, for example, 500 p.s.i. If pressure on foot pedal 13 is released, the outside drive wheel brake only is released with inside drive wheel brake remaining applied. As the steer wheels are turned from an extreme turn position, extension of the contracted actuator permits its piston to move and brake is released.

From the foregoing description, it is apparent that I have provided a reliable mechanism for automatically braking the nonsteered wheel on the inside of the turn to thereby assist in achieving the shortest possible turn. By connecting the actuators in the brake conduits, I minimize the amount of additional structure required and make possible the addition of automatic hydraulic brake adjusters in each of the actuators. My automatic braking system is effective in vehicles with brakes on all wheels as well as vehicles with brakes on two nonsteerable wheels. The dash lines in FIG. 1 illustrate the extension of the braking system to all four wheels.

The embodiments of the invention for which an exclusive property or privilege is claimed are defined as follows:

1. In a vehicle having a frame, at least one steerable wheel at one end thereof, a steering apparatus connected to the one steerable wheel, a pair of nonsteerable wheels at the other end of said vehicle, a braking system for the nonsteerable wheels including a fluid operated wheel brake with wheel cylinder associated with each nonsteerable wheel, and a manually controlled fluid pressure delivery means connected to the wheel brakes, the improvement comprising:

a mechanism for automatically braking one of said nonsteerable wheels when the one steerable wheel is steered in a direction to effect turning of the vehicle about said one nonsteerable wheel including a pair of hydraulic actuators connected in fluid delivery relation to said wheel cylinders, respectively, and means operating one of said actuators to deliver pressure fluid to the wheel cylinder of the wheel brake of one of said nonsteerable wheels to brake the latter in response to said one steerable wheel being steered by said steering device to effect short radius turning of the vehicle about said one nonsteerable wheel.

2. The invention set forth in claim 1 wherein a pair of fluid conduits connect said fluid pressure delivery means to said wheel cylinders, respectively, and said hydraulic actuators are connected, respectively, to said fluid conduits and further comprising a pair of means operatively associated with each of said fluid conduits, respectively, each operable to prevent fluid flow in the associated conduit in the direction toward said fluid pressure delivery when the actuator connected to said associated conduit is operated.

3. The invention set forth in claim 2 wherein said actuators each include cylinder and piston structures defining a pressure chamber and wherein said steering apparatus is in thrust transmitting relation to one of said cylinder and piston structures of each of said actuators.

4. The invention set forth in claim 3 wherein each of said piston structures has a lost motion connection with said steering apparatus.

5. The invention set forth in claim 3 wherein each of said piston structures includes a piston having a fluid passage therethrough, a check valve in said passage, a seat for said check valve and a rod having one end connected with said piston for a predetermined lost motion movement thereto, said one end of said rod abutting said check valve to hold the latter in a closed position, thereby closing said passage and moving said piston when the actuator incorporating said piston is operated by steering apparatus to deliver pressure fluid to said wheel brake and wherein opposite ends of said cylinder structure are connected to said conduit whereby fluid from said fluid pressure delivery means causes said wheel brake to be actuated through movement of said piston relative to the cylinder structure associated therewith.

6. The invention set forth in claim 5 wherein each of said cylinder structures includes an axially facing abutment engageable with said valve to hold it off its seat when said piston is moved a predetermined distance in the direction toward its extreme fluid delivery position thereby permitting makeup fluid to be delivered by said fluid pressure delivery means to the wheel brake side of said piston.

7. The invention of claim 1 wherein said nonsteerable wheels are differentially connected drive wheels, said apparatus has a lost motion thrust transmitting connection with said actuators, and said actuators have piston and cylinder structures defining pressure chambers, respectively, and further comprising conduits connecting said pressure chambers to said wheel cylinders, respectively.

References Cited

UNITED STATES PATENTS

| | | | |
|---|---|---|---|
| 1,825,220 | 9/1931 | Char | 180—6.24 |
| 2,347,241 | 4/1944 | Boldt | 180—6.3 |
| 2,366,207 | 1/1945 | Milster | 180—6.3 |
| 2,389,498 | 11/1945 | Gates | 74—710.5 |
| 2,442,601 | 6/1948 | House et al. | 180—6.3 |
| 2,925,133 | 2/1960 | Thomas | 180—6.26 |

LEO FRIAGLIA, *Primary Examiner.*

L. DANIEL MORRIS, JR., *Assistant Examiner.*

UNITED STATES PATENT OFFICE
CERTIFICATE OF CORRECTION

Patent No. 3,429,392                                              February 25, 1969

Neil J. Ryskamp

It is certified that error appears in the above identified patent and that said Letters Patent are hereby corrected as shown below:

Column 5, line 30, after "movement" insert -- relative --; line 33, after "by" insert -- said --.

Signed and sealed this 24th day of March 1970.

(SEAL)
Attest:

Edward M. Fletcher, Jr.                          WILLIAM E. SCHUYLER, JR.
Attesting Officer                                    Commissioner of Patents